United States Patent [19]
Stone et al.

[11] 3,982,413
[45] Sept. 28, 1976

[54] KING PIN LOCK FOR SEMI-TRAILERS

[76] Inventors: Richard A. Stone, 7235 17th Ave. S., Minneapolis, Minn. 55423; Mathias H. Riesgraf, 4945 Pennine Pass, Columbia Heights, Minn. 55421

[22] Filed: Mar. 17, 1975

[21] Appl. No.: 559,144

[52] U.S. Cl. .............................. 70/229; 116/28 R; 280/433
[51] Int. Cl.² ......................................... F16B 41/00
[58] Field of Search................... 280/433, 432, 507; 70/231, 232, 18, 14, 229; 116/28 R, 173

[56] References Cited
UNITED STATES PATENTS

| | | | |
|---|---|---|---|
| 2,656,706 | 10/1953 | Lucas et al. ........................ 70/232 |
| 3,269,159 | 8/1966 | Young ............................ 280/433 X |
| 3,785,337 | 1/1974 | Flowerday ..................... 116/173 X |
| 3,834,196 | 9/1974 | Stone ...................................... 70/18 |

FOREIGN PATENTS OR APPLICATIONS 359,361   2/1962   Switzerland......................... 280/507

*Primary Examiner*—M. H. Wood, Jr.
*Assistant Examiner*—John A. Pekar
*Attorney, Agent, or Firm*—John W. Adams

[57] ABSTRACT

This is a lock which can be quickly and easily attached to the locking groove of the king pin of a trailer to block entrance of the king pin into the attaching slot of the "fifth wheel" of a tractor, the lock having a pair of pivotally connected pin-surrounding locking segments with a snap-in lock element to hold the segments in closed position and also incorporating a safety warning sign to indicate the presence of the lock on the king pin and prevent inadvertent damage to the lock or the tractor unit.

1 Claim, 5 Drawing Figures

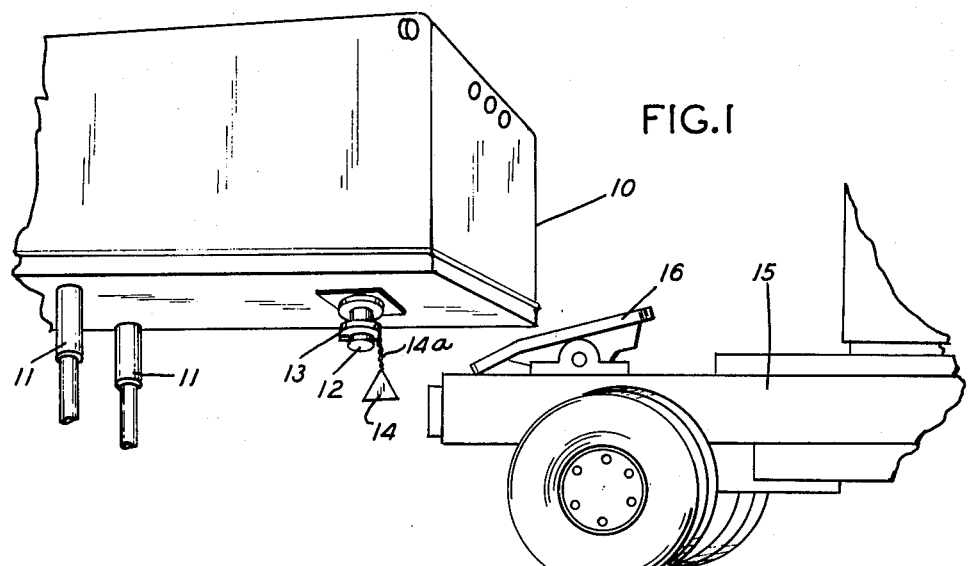
FIG. 1
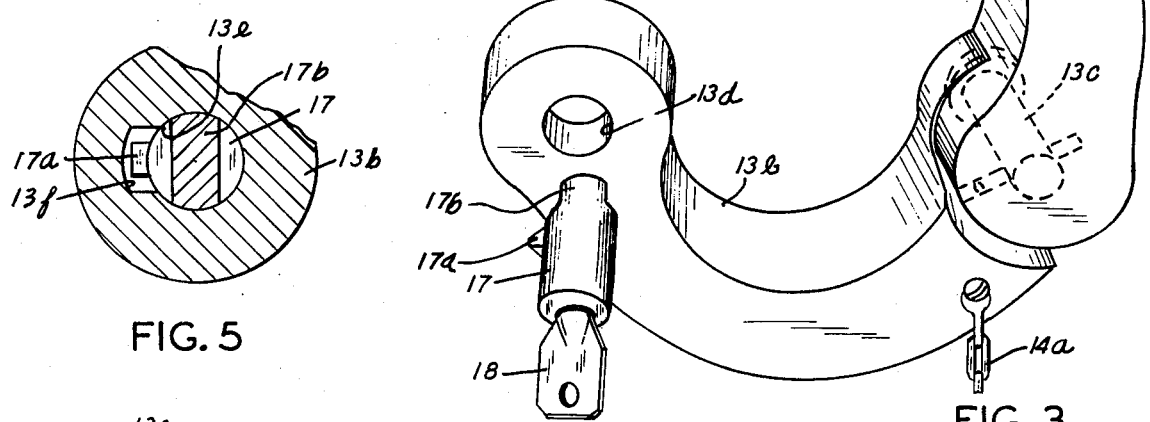
FIG. 2
FIG. 3
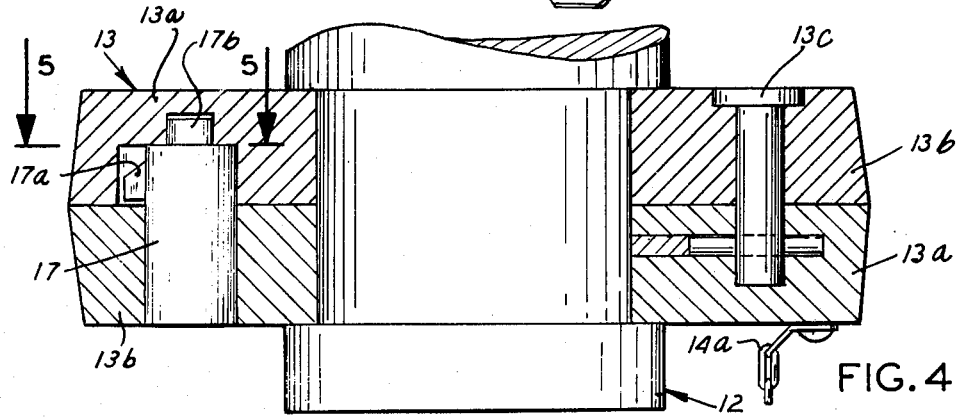
FIG. 5
FIG. 4

KING PIN LOCK FOR SEMI-TRAILERS

In the past a number of different types of king pin locks have been developed; however, these have all been difficult to install and remove and have been considerably more expensive than the lock embodying this invention.

It is an object of this invention to provide a relatively simple, easily installed and removed king pin lock which is attached in the groove of a trailer king pin to prevent the same from being received into the slot of the "fifth wheel" of a tractor unit.

More specifically, it is an object to provide a king pin lock made in the form of a pair of pivotally connected curved arm or jaw elements adapted to be quickly and easily spread apart to receive the king pin therebetween and thereafter adapted to be closed around the king pin in the locking groove thereof and to be quickly locked in closed position in said groove by means of a snap-in lock unit.

These and other objects and advantages of this invention will more fully appear from the following description made in connection with the accompanying drawings in which like reference characters refer to similar parts throughout the several views, and in which:

FIG. 1 is a perspective view showing the rear end of a tractor and the front end of a trailer unit with the lock embodying this invention installed on the king pin of the trailer;

FIG. 2 is a top plan view showing the lock in operative position preventing the king pin from being received in the slot of the "fifth wheel" of the tractor;

FIG. 3 is a perspective view of the lock in open position;

FIG. 4 is a vertical sectional view of the lock in locked position in the groove of the trailer king pin; and FIG. 5 is a horizontal sectional view of the snap-in locking mechanism taken substantially along the line 5—5 of FIG. 4.

FIG. 1 shows the front portion of a semi-trailer unit 10 having a pair of retractable storage legs 11 mounted thereunder.

A king pin 12 is fixed under the forward portion of the trailer body and our lock unit 13 is mounted in a groove provided in said king pin as illustrated. A safety warning signal 14 is mounted on the lock 13 and is attached thereto by means of a flexible chain or the like, designated by the numeral 14a. The warning signal 14 is sufficiently large to be easily visible to the driver of the tractor unit so that he will not inadvertently back into the trailer if the lock is attached thereto.

A tractor unit 15 is also illustrated in FIG. 1 and has a "fifth wheel" 16 mounted in the conventional manner at the rear thereof. As best shown in FIG. 2 a receiving slot 16a in the "fifth wheel" 16 is designed to receive the king pin therein and the body of the lock 13 is sufficiently large to positively obstruct entrance of the king pin into the mouth of said receiving slot 16a. The lock 13 is formed from a pair of generally semi-circular curved arms or segments 13a and 13b, best shown in FIG. 3. The end portions of the segments 13a and 13b are formed in half thickness mating attachment end portions and a pin 13c pivotally connects one pair of mating ends together, as shown in FIG. 3. As illustrated, the other end of segment 13b has an opening extending therethrough to receive a lock unit 17, therein and the other mating end of segment 13a has a lock-receiving recess 13c formed therein to positively hold the two sections together in locked position when a lock has been inserted through the opening 13d in segment 13b and into the recess 13e in segment 13a.

A spring latch key lock element 17 is illustrated and has a conventional recessed cylinder type spring lock unit such as is made by the Chicago Lock Co. of Chicago, Illinois and identified as Model ACE-Ry-2, and which has a spring latch 17a which positively engages the underside of the portion of the segment 13b surrounding the hole 13d when in locked position. Another type of lock (not illustrated) which has been found to be satisfactory is manufactured by the Hudson Lock, Inc., Hudson, Mass. and is identified as Industrial Plug Lock No. A-21.

When the arms 13a and 13b are closed the recess 13e in arm 13a is aligned with the hole 13d provided through the mating end portion of arm 13b to permit the locking unit 17 to be projected into locking position in the recess 13e as best shown in FIG. 4.

The lower end portion 17b of the lock element 17 is reduced in width to provide squared off shoulders which are received in the bottom of the recess 13e which is also provided with squared shoulders to prevent rotation of the lock unit when in locked position as shown in FIG. 4.

The recess 13e has a latch receiving keyway 13f formed in one side thereof to permit the spring latch element 13a to be inserted into locking position and to be positively captured in locking position by the inside mating surface of the arm 13b as best shown in FIG. 4.

The arm segments 13a and 13b of the lock unit 13 are of sufficiently large cross-sectional dimensions to prevent the same from being received between the jaws of a lever-type large size bolt cutter and, except for the spring latch key lock element 17, are of generally similar construction to the bicycle lock disclosed in U.S. Pat. No. 3,834,196 to Richard W. Stone, one of the joint inventors of the present invention.

It will be seen that we have provided a relatively simple yet very effective king pin lock for semi-trailer vehicles which can be quickly and easily installed in locking position within the groove of the trailer king pin and thus prevent the king pin from being received in the attaching slot 16a of the fifth wheel 16 of a tractor unit.

It will, of course, be understood that various changes may be made in the form details, arrangement and propositions of the parts without departing from the scope of this invention which is defined by the appended claims.

What is claimed is:

1. In combination with a semi-trailer vehicle having a depending king pin with a circumferential locking groove formed in the lower portion thereof;

a lock to obstruct and thus prevent connection of the trailer with the fifth wheel of a tractor, said lock comprising a pair of generally semi-circular similar locking segments each having a pair of mating overlapping end portions of reduced thickness and forming a body of substantially the same width as the groove in the trailer king pin, the inside diameter of each semi-circular segment being substantially equal to the diameter of the circumferential king pin groove to permit the segments to be received in locking position in the king pin groove and completely surround the same, means for locking the two pairs of mating overlapped end portions of the two segments together in locking king pin position surrounding said king pin within the groove thereof to positively obstruct and prevent the king pin from entering the receiving slot of the fifth wheel of a tractor, said locking means including pivotal means connecting the mating portions of one end of said locking segments, the mating portions of the other end of said segment having lock receiving passages therein and disposed in registration when the segments are in closed locking position, a lock element passing through the passage in one of the segments and received in locking position within the passage in the mating end of the second segment when the segments are in closed position, and the passage of said second segment having a latch-receiving keyway and said lock including a spring latch element to permit the same to be snapped into locking position within said keyway when the segments are in closed position.

* * * * *